Jan. 23, 1962 K. ONDER 3,018,371

RADIO RECEIVERS

Filed Sept. 17, 1953 2 Sheets-Sheet 1

INVENTOR.
KERIM ONDER
BY
Arthur L. [signature]
ATTORNEY

Jan. 23, 1962 K. ONDER 3,018,371

RADIO RECEIVERS

Filed Sept. 17, 1953 2 Sheets-Sheet 2

INVENTOR.
KERIM ONDER
BY Arthur L. Tirico
ATTORNEY

United States Patent Office 3,018,371

Patented Jan. 23, 1962

3,018,371

RADIO RECEIVERS

Kerim Onder, 615 W. 113th St., New York, N.Y., assignor of 15/100 to Arthur L. Tirico, Glen Ridge, N.J.

Filed Sept. 17, 1953, Ser. No. 380,845
1 Claim. (Cl. 250—20)

This invention relates to improvements in methods of and means for (1) selecting from a plurality of simultaneously received radio frequency signals any desired one thereof and (2) extracting its lower-frequency intelligence-bearing components unaffected by those of the others. More particularly it relates to improvements in F.M. receivers for eliminating adjacent- and co-channel interference of undesired signals and even co-channel interference of the desired one arriving over one or more secondary transmission paths.

In the prior art of radio receivers generally it has been customary to accomplish selection by using enough tuned circuits before demodulation to restrict the pass band of the receiver to the spectrum of the desired signal. While this has often been effective enough against totally off-channel interference, such as adjacent-channel interference, it has been completely ineffective against significant amounts of co-channel interference including the kind which may be termed multi-path "self" interference. Moreover it has been unsatisfactory in a more positive sense by having some effects which, as will be seen, actually make elimination of co-channel interference after narrow band amplification even more difficult than it might have been without it, and other effects which directly degrade the desired signals in ways not dependent on the presence of any kind of interference. For while the impedance of such a selective transmission channel of multiple tuned circuits may appear to be quite resistive and uniform for the carrier wave and a few of its nearest side bands, it will at the same time appear to be capacitive and inductive as well as non-uniform to its more widely separated sets of side bands. As is known this degrades the signal due to unequal amplification and phase shifting and because of this the tuned circuits are often modified and/or used in very specialized ways, e.g., they are resistance loaded to lower their "Q's"; they are used in groups of two or more critically coupled together to achieve broad banding; and they are stagger-tuned for the same purpose. However these expedients not only result in severe aggravation of the difficulties of making and maintaining proper adjustments of tuning but in addition involve the need for new kinds of even more difficult adjustments. In addition, apart from the various harmful effects on performance, the use of large numbers of tuned circuits for selection adds also to the costliness of receivers and increases the difficulty of maintaining them.

Similarly in the particular prior art of F.M. receivers tuned circuits have been relied on for accomplishing demodulation, in this instance for their variable-impedance versus frequency characteristics. These tuned circuits like those used for selection add to costliness and to the difficulties of maintenance and in addition even have many inherent functional disadvantages. For one thing it is very difficult to design and adjust them so as to attain satisfactorily linear detection over a band large enough to cover all of the spectrum of the signal with a reasonable margin of safety on either side thereof. This results in a common failing of F.M. receivers, namely, that any slight drifting in some parameter governing the tuning of the receiver, say in the frequency of the local oscillator, usually results in very non-linear detection and hence in extremely bad distortion. This failing is a particularly bad one in view of the fact that these receivers are principally vaunted for a purported ability to deliver a high fidelity output signal. In practice it is sought to avoid this kind of distortion by making continual tuning readjustments while the receiver is in actual operation either manually or by automatic frequency control circuits which are themselves usually susceptible to maladjustments.

As is demonstrable mathematically and as I have confirmed empirically, when two or more discrete or at least out-of-phase frequency modulated signals, one of which is substantially stronger than any other, have coincident or overlapping spectra and occur together on a common transmission medium an additive wave results which, though it may differ markedly from said stronger signal in its amplitude excursions and its wave form (for example, certain cycles of the additive wave may be spike shaped instead of sinusoidal) and/or in its instantaneous phase (and thereby in its instantaneous frequency), will nevertheless have the same average frequency as the said stronger signal for any interval of time as long as the period of the highest frequency significant-component of the relatively-low frequency, intelligence-bearing wave with which its carrier was modulated. Because of this, if the additive wave can be transmitted through the receiver to the demodulator without any distortion which will affect that average frequency, for example, without any spiked-shaped waves failing to pass through due to pass band inadequacy, and if the demodulator has as wide a pass band as the spectrum of the additive wave and is solely responsive to variations in said above mentioned average frequency of the stronger signal for intervals as long as the above mentioned period, it will be possible to extract the intelligence-bearing components of the desired signal completely unaffected by those of the others.

However, since the spectrum of the additive wave is much wider than that of any individual one of the mutually interfering signals it cannot pass through the narrow pass band of a receiver in which selection is accomplished, as it usually is, by the use of multiple tuned circuits, without sustaining considerable distortion which will affect its said average frequency. Therefore, once adjacent or co-channel interference enters the pass band of the receiver along with the desired signal, it will no longer be possible to extract the low-frequency, intelligence-bearing, modulating-wave unimpaired by serious distortion. Moreover, prior art demodulators employing tuned circuits to extract the frequency modulating component also have such narrow pass bands that they too will distort the additive signal so as to affect its said average frequency thereby either adding to the distortion of the demodulated intelligence or being solely responsible for it if, by some miracle, the additive signal should happen to have gotten through the selecting, amplifying and limiting stages with the intelligence component of the strongest discrete input signal still intact.

It follows from the foregoing that at least theoretically one possible solution would be to modify an otherwise substantially conventional F.M. receiver by employing various known expedients for broad banding its various tuned circuits and/or combinations of tuned circuits to thereby broad band its signal transmission channel from end to end. However this solution is very much more theoretical than real and, in addition it entails multiplying many of the disadvantages mentioned above. Therefore no truly satisfactory solution can be attained by such modifications of conventional receivers, e.g., by using increased numbers of tuned circuits critically coupled together in pairs or groups; stagger tuned, and/or resistance-loaded to lower their "Q" 's.

In view of the foregoing it is an object of this invention to devise improvements in methods of and means for selecting desired radio frequency signals and extracting their lower-frequency, intelligence-bearing modulating-waves.

It is a further object to devise improvements in F.M. receivers for reducing adjacent and co-channel interference effects.

It is a further object to devise simplifications in F.M. receivers whereby they are easier and less expensive to manufacture and maintain.

It is a further object to devise improvements in F.M. receivers whereby even if desired signals are received over one or more secondary transmission paths as well as over a primary path, i.e., if they are received as "multi-path" transmissions, it is possible to extract the intelligence-bearing modulating wave undistorted by what is herein referred to as co-channel self-interference effects.

It is a further object to devise an improved type of F.M. receiver which, by being relatively immune to multi-path-transmission, co-channel-self-interference effects, can operate satisfactorily in a moving vehicle or under any other circumstances in which directivity of an antenna cannot be relied on to reject or to continue to reject interference arriving over secondary transmission paths.

It is a further object to devise improvements in F.M. receivers whereby they are much less susceptible, if at all, to distortion effects resulting from inaccuracies and/or variations in tuning, e.g., due to instability of its local oscillator.

It is a further object to devise improvements of the kind set forth in the preceding paragraph whereby automatic frequency control circuits are unnecessary in such receivers.

It is a further object to devise improvements in F.M. receivers whereby such strong limiting action is afforded that automatic gain control circuits are unnecessary and exceptionally high-to-noise ratios are attainable.

It is a further object to devise an improved F.M. receiver which, by attaining such strong limiting as to be relatively immune to noise, including for example ignition noise, and to afford a substantially constant-strength output signal regardless of the strength of the input signal and of variations therein, can operate satisfactorily in a moving vehicle even if the vehicle itself generates a considerable amount of "man-made" noise interference and is not equipped for suppression thereof.

It is a further object to devise improvements in F.M. receivers whereby they are better adapted to miniaturization.

It is a further object to devise improvements in F.M. receivers whereby they are lighter and therefore particularly suitable for use in aircraft.

It is a further object of this invention to devise improvements in F.M. receivers whereby due to the elimination of many tuned circuits no grounded coil shields are needed and therefore they are adapted to A.C.-D.C. types of design of increased safety since the chassis can be left insulated from the wiring.

In general these and other objects are attained according to the present invention by using circuits for amplification, limiting, and demodulation all of which have been sufficiently broad banded to pass all of the spectral components of any additive wave into which the desired signal may have lost its individual identity, as described above, by becoming only a part thereof due to adjacent or co-channel interference, at least some of the circuits through which the additive signal passes after heterodyning being broad banded through the use of resistive rather than tuned impedances, e.g., as loads and in couplings. More particularly these and other objects are attained according to the present invention by methods and means accomplishing the following steps: (1) initially effecting preliminary frequency selection of the desired signal by adjusting a relatively small number of tuned circuits so that the frequency pass band of the receiver will pass with substantially equal amplification all of the significant spectral components of the desired signal with enough extra bandwith to spare on either side to similarly pass all similar components of any additive wave into which said signal may have lost its individual identity, as described above, by becoming only a part thereof due to co-channel interference; (2) heterodyning the components, after they have thus passed through a first selective part of the receiver, into a relatively low frequency range, such as a range between zero and one million cycles per second, wherein it is possible to achieve broad band amplification and limiting using resistive rather than tuned impedances; (3) amplifying and limiting the heterodyned components in circuits comprising a plurality of stages of resistance coupled amplifying devices; (4) differentiating and rectifying the train of F.M. square waves produced by the preceding steps to convert it into a train of spike-shaped waves of substantially equal energy content regardless of any variations in the durations of the square waves; and (5) integrating the train of spike-shaped waves in a circuit having an appropriate RC time constant to produce an output comprising in addition to a D.C. component which is proportional to the heterodyned carrier frequency of the desired signal, an A.C. component corresponding in its frequency and amplitude variations to those of the intelligence-bearing low-frequency wave with which the carrier of the desired signal was modulated.

In the drawing:

FIG. 1 is a block diagram schematic representation of an F.M. receiver according to the present invention;

FIGS. 2*a* and 2*b* are circuit diagrams representing two types of suitable "front end" portions of the receiver shown in FIG. 1;

Figure 1:
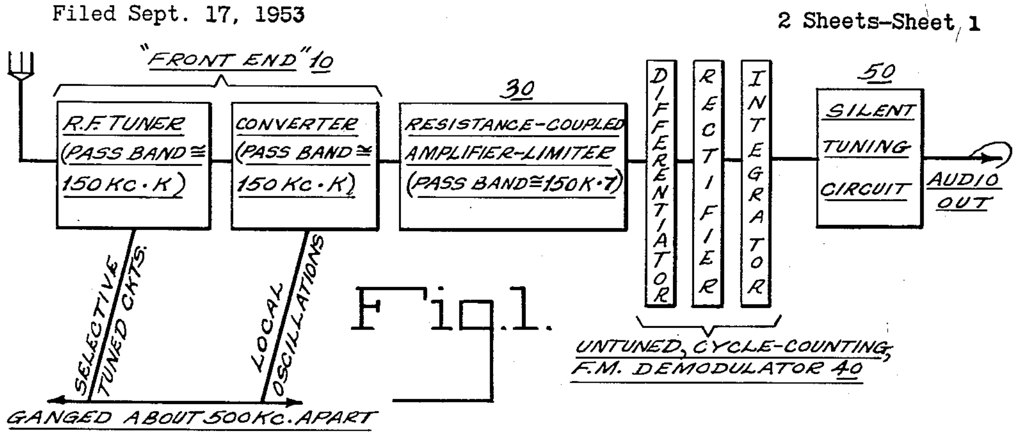

In both of the front ends, **10*a* and 10*b*, shown herein oscillating detectors, 11*a* and 11*b***, are used for heterodyning, rather than oscillator-mixer combinations or multiple input "converters," for at least two reasons: (1) because this regenerative type of first detector has very much greater gain than the above-mentioned more-conventional types; and (2) because the amplitude distortion which a regenerative circuit can introduce is not detrimental in F.M. receivers wherein, as is known, limiting is desirable and in fact actually necessary for proper operation.

The front end **10*a* comprises an inductance-tuned anti-resonant input circuit 12*a* over which the output, 13, of the antenna circuit is coupled to the control grid 14*a* of a first R.F. voltage amplifying section of a double-triode tube 15. This section is directly coupled to the tube's second section, by using a common cathode resistor 16 while stablizing the control grid 17 of the second section at ground potential, and an R.F. choke 18 is used as the plate load impedance for the second section. Both sections of the tube 15 are energized from a D.C. source, "B+," over a decoupling network 19, 20.**

The output of the second section of the tube 15 is coupled over a blocking condenser 23 to the control grid 21 of the oscillator tube 22 of the oscillating detector **11*a* which is of a conventional tuned grid type having an inductance tuned anti-resonant circuit 25*a* connected in shunt between the grid 21 and ground and coupled to a positive feed-back loop 26 in the plate circuit of the tube 22.**

The anti-resonant circuits **12*a* and 25*a*** are ganged together so that as the former is tuned over the entire range of the R.F. spectrum assigned to F.M. transmissions, the latter will "track" along to maintain a 500 kilocycle spread between the two, it being a matter of choice which of the two is the higher. As will be understood by those familiar with the art, it will be unusually easy to achieve excellent tracking in this receiver due to the fact that the reactances comprising its gang-tuned circuits can be more nearly identical than in conventional receivers which must necessarily use much greater frequency separations between their tracking tunable circuits in order to produce the customary radio-frequency intermediate frequencies. As will also be understood the pass band of the front end 10*a* will be much greater than the, say, 150 kilocycle spectrum of a typical F.M. signal due to the fact that its selective circuits 12*a*, 25*a* are tuned to high frequencies and are few in number. As a matter of fact I have found that the pass band of such front ends are more than adequate to pass all of the components of the additive waves which will be present, as explained above, whenever there is co-channel interference.

In this connection it is noted that the bandwidth which is necessary to pass an additive wave depends on and, in fact, is inversely proportional to how much stronger the desired signal is than the interfering one. Thus if the spectrum of a typical F.M. signal is 150 kilocycles, the bandwidth required to pass an additive wave of two such co-interfering signals is approximately N times as wide, i.e., $N \cdot 150$ kilocycles, where $$N=\frac{1+(\text{ratio of the avg. ampl. of the weaker signal to that of the stronger})}{1-(\text{ratio of the avg. ampl. of the weaker signal to that of the stronger})}$$

From this relationship one can readily determine that for three illustrative examples in which the average amplitudes of the desired and interfering signals are respectively 1, 2 and 3 decibels apart the required bandwidths will have to be, respectively, 19, 9 and 5 times as great as the spectrum of either of the signals taken alone. Since, as will be seen the narrowest portion of the present receiver has a bandwidth of one full megacycle, it can successfully pass the additive wave of two signals which are only 2½ decibels apart (and therefore can extract the modulating wave of the stronger signal with substantially no discernible interference effects from the weaker) whereas conventional receivers cannot do the same thing for signals which are as much as thirty decibels apart.

For reasons which are well known the output of the oscillating detector will include, for each component of the desired signal or additive wave amplified in the tube 15, two modulation products whose frequencies will be respectively equal to that of the said component (or that of the local oscillations) plus and minus that of the local oscillations (or that of the said component depending on which of the anti-resonant circuits 12*a* and 25*a* is tuned to the higher center frequency). Accordingly these products will include one group of components high up in the range of radio frequencies and another group in the relatively low-frequency range, below 1 megacycle, of about 425–575 kilocycles.

Figure 2A:
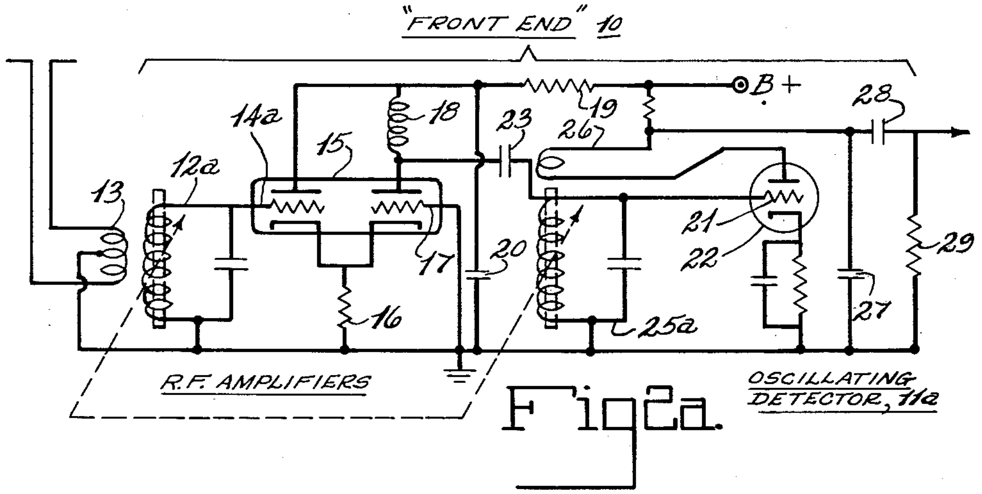

Because these groups are so widely separated the former can very easily be eliminated by a simple by-pass condenser 27 while the latter is coupled over to the amplifier-limiter 30 (see FIG. 1) over a D.C.-blocking, coupling condenser 28. As shown in FIG. 2*a*, the output of the front end 10*a*, thus delivered over the condenser 28, will appear across a load resistor 29 which, in the receiver shown herein, is in effect the grid resistor of the input tube of the amplifier limiter 30.

Figure 2B:
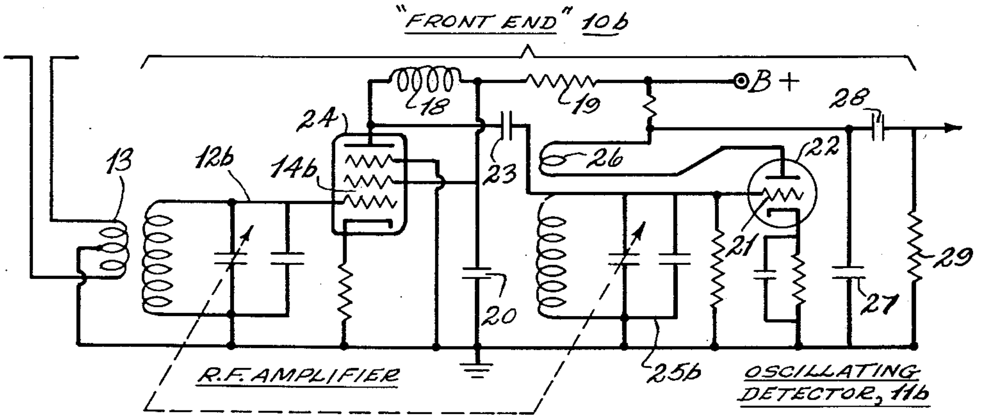

As is indicated by the use of a number of corresponding and identical reference numerals the front end 10*b* of FIG. 2*a* is very similar to that 10*b* of FIG. 2*b*, its principal differences being: that its selective circuits 12*b* and 25*b* are capacitively, rather than inductively tuned; that it uses one rather than two R.F. amplifier stages; and that that stage uses a pentode 24 rather than a triode.

Figures 3, 4, 5, 6:
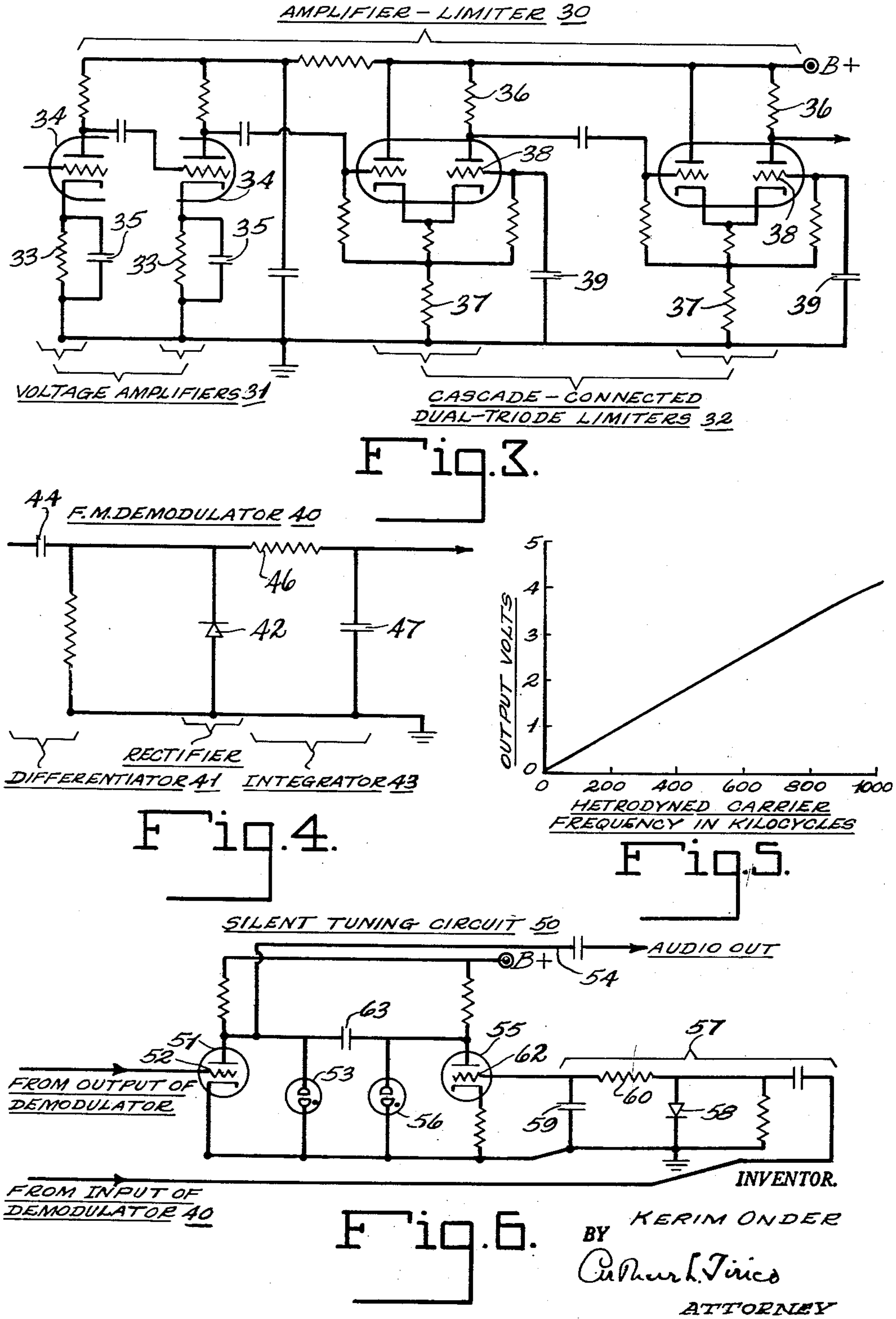
FIG. 3 is a circuit diagram representing a suitable amplifier-limiter for a FIG. 1 type of receiver.
FIG. 4 is a circuit diagram representing a suitable demodulator for a FIG. 1 type of receiver.
FIG. 5 is a curve representing a performance characteristic of the demodulator of FIG. 4.
FIG. 6 is a circuit diagram representing a suitable silent tuning circuit for a FIG. 1 type of receiver.

Referring to FIG. 3 it will be seen that the amplifier limiter 30 comprises a number of resistance-coupled voltage amplifiers 31 followed by a number of cascade limiters 32, the first of the latter being used at the point in the circuit where the heterodyned output of the front end has already been amplified to such an extent that there is a possibility that the grid of the stage in question may be made to draw current, i.e., that limiting may start to occur. Since, as is known, the input side of a cascade limiter acts like a cathode follower, it will offer a uniformly high impedance to the circuit feeding it even for larger amplitude swings of the signal reaching the said input than the quiescent grid-to-cathode bias thereof. While this is not the only resistance-coupled amplifier-limiter arrangement which can afford the necessary gain over the wide pass band, it is a very good one due to the capability of the amplifiers 31 to afford maximum initial voltage gain and of the limiters to afford excellent quality final limiting, i.e., limiting in which each cycle of the desired signal wave (or of the additive wave including it) is converted into a true square wave having very steep leading and trailing edges, a very flat top and an exactly predetermined amplitude. As is known, particularly to those familiar with the art of digital computers, cascade limiters are very efficient for making square waves of sinusoids. Since all of the circuit details employed in the amplifier-limiter 30 are well known it is believed to be unnecessary to describe them in detail. However it may perhaps be helpful to note the following features: (1) that the cathode biasing resistor 33 of each of the triodes 34 employed in the voltage amplifiers 31 may be by-passed with a small condenser 35, e.g., one of .005 microfarad, so that the degeneration caused by this resistor will begin to drop off at some frequency, e.g., 300 kilocycles for a .005 mfd. condenser, to the end that the gain of the stage will be sufficiently boosted in this way to compensate for its concomitant progressive diminution in gain, with increasing frequency, due to certain well known effects of stray and distributed shunt capacitance. In other words, these condensers are used, in a perfectly conventional way, for broad banding and in particular for keeping up the high frequency end of the gain vs. frequency characteristic; (2) that the anode resistor 36 of the output section of each of the limiters 32 is low enough to afford the desired bandwidth, in accordance with standard video amplifier practice, and to avoid overdriving the input section of the following limiter (this being of course eventually possible despite its cathode follower action); (3) that the input section of each limiter is directly coupled to its output section by using a common cathode load resistor 37 and A.C. short circuiting the control grid 38 of the output section to ground with a condenser 39.

If desired, the pass band of the amplifier-limiter can be greatly extended by resort to well known video amplifier design practices, e.g., load impedances may be employed which, though untuned, comprise reactances as well as resistances, for example plate load impedances each of which comprises a small coil in series with a small resistor. In fact actual video amplifiers may be employed provided they include enough stages to afford limiting. A variety of such amplifiers are available which have bandwidths of four or even five megacycles, these being so large, i.e., 33 times as great as the spectrum of the usual F.M. signal, that a receiver of the kind disclosed herein which employs such an amplifier-limiter would be able to effectively separate mutually-interfering, co-channel signals much less than 1 decibel apart in their average amplitudes.

As shown in FIG. 4 the demodulator 40 comprises a differentiator 41, a rectifier 42, and an integrator 43. The time constant of the series condenser 44 and shunt capacitor 45 of the differentiator 41 should be short enough so that it will produce the same kind of spike-shaped pulses from the shortest-duration square waves which reach it from the amplifier-limiter as it does from any of the others, e.g., the longest. The rectifier 42 may be connected across the differentiator 41 in either direction since the only difference which this can cause will be in the polarity of a D.C. component which will be present in the output of the demodulator and which it will produce in response to the heterodyned carrier component of the single or additive signal originally received. For the purpose of converting the frequency modulated train of spike-shaped pulses into a wave, e.g., an audio signal, like that of the intelligence-wave with which the transmitter of the desired signal was originally modulated, the time constant of the series resistor 46 and shunt condenser 47 of the integrator should be short enough for it to follow frequency variations which occur in intervals as short as the periods of the highest frequency components of said intelligence wave. However if desired the time constant may be made slightly larger so that the integrator, instead of providing a truly faithful reproduction of said intelligence wave, we will provide a de-emphasized version of it. Thus the integrator may be made to perform in a dual capacity, one as an essential part of the demodulator and the other as a de-emphasis circuit for eliminating the reversible distortion to which intelligence-waves are usually deliberately subjected, before being used for modulating F.M. transmitters, for certain reasons which are well known and do not have to be further considered herein.

When the present receiver is tuned over a wide enough range to: (1) first approach in one direction a range of adjustments in which its selective circuit (12*a* or 12*b*) will pass a desired signal; (2) thereafter attain and move through said range; and (3) finally leave said range in the opposite direction, the demodulator 40 will produce, in response to the received signal, an output comprising two components: (1) a D.C. voltage which will vary in magnitude in a substantially linear manner, as shown in FIG. 5, as said tuning is effected over said range and an A.C. ("intelligence-wave") component which will not vary in amplitude as a function of said tuning but rather as a function of the variations in the "loudness," intensity, or dynamics of the transmitted intelligence. The D.C. component will vary for the following reasons: as said tuning is effected over said range and therefore the desired signal is able to pass through the selective circuit (12*a* or 12*b*) to the oscillating detector (11*a* or 11*b*) its average frequency will, of course, remain constant; however the frequency of the local oscillations will not remain constant; and, because of this, the heterodyned average (or "carrier") frequency, will only be 500 kilocycles at one point near the center of the tuning range and it will be increasingly higher and lower at progresssively-further off-center points in the tuning range on opposite sides of the 500 kilocycle point. Inasmuch as variations in the magnitude of the D.C. component have no influence on the quality of the A.C. signal and since the response curve of the demodulator is linear over a wide range, the tuning adjustment of this receiver can drift very widely without its having tendency to distort the quality of a signal being received. However, as will be apparent from the foregoing, the tuning adjustment should be fairly near to the center point where the desired signal is being received along with co-channel interference, this being desirable because of the greater bandwidth requirement of the additive signal.

Of course distortion will occur where a tuning adjustment is such that the average frequency of the heterodyned signal is very close to either one of the two ends of the linear range of the characteristic shown in FIG. 5. Thus distorted signals can be kept from reaching the output of the receiver in various ways, e.g.: (1) by somewhat restricting the pass band of the front end so that the signal is not received at such far off-center points; and (2) by using an automatic circuit for disabling the audio circuit when the tuning adjustment is off-center by more than a predetermined amount.

The silent tuning circuit 50 shown in FIG. 6 is a suitable circuit for thus disabling the audio circuit. It comprises an audio amplifier tube 51 to whose control grid 52 is fed both the A.C. and the D.C. components of the output of the demodulator 40. This tube may be at least partly biased by the D.C. component from the demodulator, provided the rectifier 42 is properly poled, to act as a class A amplifier (for the A.C. component) and its plate voltage is adjusted to produce an insufficient anode-to-ground voltage drop, under control of the values of the D.C. component resulting from tuning which is not too far above center, to fire a shunt-connected neon-filled diode 53. However, as the tuning moves off-center, in the high frequency direction, for more than a certain amount, the magnitude of the D.C. component which is applied to it will reach a value at which it can increase the voltage drop across the tube 51 sufficiently to fire the diode 53. This will effectively ground the anode circuit of the tube 51 thereby disabling the transfer of any audio signal out of the receiver over the output 54. I have found that the tube 53 may be an ordinary grain of wheat type of inexpensive neon-filled diode employing two small parallel rods as electrodes. Such tubes fire at about 60 volts and can be quenched readily by readjusting the tuning in the downward direction for a short distance. If then the tuning is further readjusted far enough downward to pass through the center point and approach a predetermined point corresponding to the low voltage end of the FIG. 5 curve, a second pair of tubes 55, 56 will act to disable the audio output circuit 54. In order to actuate the tube 55 an auxiliary demodulator 57 is provided which, like the demodulator 40, is fed from the output of the amplifier-limiter 30. However the rectifier (58) of the demodulator 57 is connected into it in opposite polarity to the connections of the rectifier 42 into the demodulator 40 so that the D.C. component is positive and the time constant of the integrator 59, 60 (and in particular the size of its condenser 59) is made large enough to filter out the audio component. The tube 55 is biased, e.g., through the use of a cathode resistor 61, so that for all of the larger magnitudes of the positive D.C. component which are applied to its control grid 62 from the demodulator 57 its anode-to-ground voltage drop will be insufficient to fire the gas diode 56. However when the receiver is adjusted sufficiently far enough below center a point will be reached at which the tube 56 will fire and thereby ground out the audio signal over the blocking condenser 63.

As will be apparent to those skilled in the art a variety of other possible switching arrangements may be used to perform the sort of audio silencing which is disclosed herein including other circuits using gas tubes as switches as well as circuits using electro-magnetic relays and/or hard tube switches instead.

While the receiver shown herein by way of example is a preferred embodiment which has proved to be very satisfactory under actual tests it is to be understood that the principle of the present invention, once it is understood, can be embodied in a variety of other ways. For example the receiver may employ a conventional front end, in which the carrier frequency of the signal is heterodyned from one radio frequency to another, e.g., from 88 to 10.7 megacycles per second, followed by some tuned intermediate frequency circuits, provided they are inadequate in number and/or quality to result in a pass band of less than $N \cdot 150$ kilocycles. Where such components are used in and near the front end, they should be followed by a second heterodyning device, using local oscillations having a fixed frequency, for converting the once-converted R.F., i.e., the I.F. frequency, to a frequency range of the order of from zero to 1000 kilocycles, this device being followed by a resistance coupled amplifier-limiter and a broad band demodulator such as one of the kind shown herein or any suitable equivalent.

The present invention can also be applied to television receivers of all kinds including those using intercarrier types of audio systems wherein, as is known the audio is extracted on a difference-frequency subcarrier which remains fixed at 4.5 megacycles per second regardless of how the tuning of the receiver front end is varied. As is also known these systems suffer from effects which are similar to those of ordinary co-channel interference because of the fact that some of the video components get through with the audio F.M. modulated 4.5 mc./s. subcarrier. Obviously improved performance will be obtainable by heterodyning this F.M. signal, by the use of local oscillations having a fixed frequency such as 4 mc./s., to the low frequency range disclosed herein and by then employing a resistance coupled amplifier-limiter and a demodulator like the demodulator 40. Incidentally, as will be apparent from the foregoing, it will not be necessary to employ silent turning circuits in any of the embodiments using fixed-frequency local oscillations.

Obviously, this invention can also be applied to television receivers which, like the earlier types, use separate video and sound intermediate frequency channels. In such receivers the sound I.F. can be heterodyned into the range between zero and 1000 kilocycles, by the use of fixed-frequency local oscillations, and thereafter amplified, limited and demodulated in accordance with the present invention.

While the amplifying devices used in the embodiments shown herein are thermionic tubes it is to be understood that the present invention is not limited thereto. For example transistors are equally well suited as is proven by the fact that television sets have been made which employ transistors in most of their components including four-megacycle-wide video amplifiers as well as by the fact that all-transistor computers including square-wave generators have also been built. Since, as is known, these low-impedance devices are preferably transformer coupled, it is apparent that a preferred broad band amplifier-limiter employing transistors would not be R.C. coupled. However, as will be apparent from the foregoing, neither will it employ tuned circuits, and in particular sharply-tuned anti-resonant circuits. Instead, it will suffice, for the purposes of the present invention that it employ only untuned impedances for its loads and in its couplings.

While the foregoing explanation of co-channel interference-effects considers the particular case of how two F.M. signals occurring on a common transmission path through the receiver will produce an "additive wave," it is to be understood that other kinds of signals and even various kinds of noise and static can combine therein with the desired F.M. signal to produce an additive wave which must reach the demodulator without substantial distortion if the desired intelligence-wave is to be extracted intact. Accordingly I found that certain receivers of this kind which I tested in moving vehicles in heavy city traffic were unmistakably effective to reject interference effects from very strong unshielded ignition noise in proportion to the operating bandwidth between the input of the amplifier-limiter and the output of the demodulator.

Obviously, many modifications and variations of the invention, as hereinbefore set forth, may be made without departing from the spirit and scope thereof, and therefore only such limitations should be imposed as are indicated in the appended claim.

I claim:

A radio receiver comprising a front end for effecting preliminary frequency selection of a desired frequency modulated signal by adjusting tunable circuit means so that the frequency pass-band of the front end will pass with substantially equal amplification all of the significant spectral components of the desired signal and all similar components of any additive wave into which said signal may have lost its individual identity due to co-channel interference; means for heterodyning the components of said signal after it has been preliminarily selected into a relatively low frequency range, such as a range between zero and one million cycles per second wherein it is possible to achieve broad band amplification and limiting using resistive rather than tuned impedances; means for amplifying and limiting the heterodyned components in circuits comprising a plurality of stages of resistance coupled amplifying devices; means for differentiating the train of frequency modulated square waves into which the selected and heterodyned signal will have been transformed by the last-mentioned means to convert it into a train of spike-shaped waves of substantially equal energy content regardless of any variations in the durations of the square waves; means for rectifying the differentiated signal so as to pass to its output side only ones of said spike-shaped waves which are of a same predetermined polarity; means, connected to the output side of the differentiating means, for integrating the spike-shaped waves of said polarity in a circuit having an appropriate RC time constant to produce an A.C. output component corresponding in its frequency and amplitude variations to those of the intelligence-bearing wave with which the carrier of said desired signal was modulated.

References Cited in the file of this patent

UNITED STATES PATENTS

| | | |
|---|---|---|
| 1,813,922 | Hansell | July 14, 1931 |
| 2,276,565 | Crosby | Mar. 17, 1942 |
| 2,378,819 | Albright | June 19, 1945 |
| 2,608,648 | Magnuski | Aug. 26, 1952 |
| 2,616,034 | Adler | Oct. 28, 1952 |
| 2,616,035 | Alder | Oct. 28, 1952 |

OTHER REFERENCES

Technical Report No. 42, dated Jan. 20, 1949, Research Lab. of Electronics, Mass. Inst. of Tech., "Interference in Frequency-Modulation Reception," by U. Granlund, only pages 4 to 11 cited of 79 pages in report.

Article by Sulzer, "Wide Band F.M. Adapter Reduces Interference," Radio Electronics, April 1950, pages 24, 25.